United States Patent
Scott et al.

(10) Patent No.: US 12,279,554 B2
(45) Date of Patent: Apr. 22, 2025

(54) MOUNTS FOR ELECTRICAL CONNECTORS, ACTUATOR ASSEMBLIES, AND RELATED METHODS

(71) Applicant: AGCO Corporation, Duluth, GA (US)

(72) Inventors: Paul Michael Scott, Wichita, KS (US); Kyle D. Blocher, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 346 days.

(21) Appl. No.: 17/758,263

(22) PCT Filed: Sep. 22, 2020

(86) PCT No.: PCT/IB2020/058837
§ 371 (c)(1),
(2) Date: Jun. 30, 2022

(87) PCT Pub. No.: WO2021/140369
PCT Pub. Date: Jul. 15, 2021

(65) Prior Publication Data
US 2023/0055247 A1   Feb. 23, 2023

Related U.S. Application Data (60) Provisional application No. 62/958,800, filed on Jan. 9, 2020.

(30) Foreign Application Priority Data

Jan. 28, 2020 (GB) .................................. 2001146

(51) Int. Cl.
*A01D 41/12* (2006.01)
(52) U.S. Cl.
CPC .................................. *A01D 41/12* (2013.01)

(58) Field of Classification Search
CPC ........ A01D 41/12; A01F 12/448; H01R 13/73
(Continued)

(56) References Cited

U.S. PATENT DOCUMENTS

| 5,102,351 | A  | 4/1992 | Meshel |
| 6,358,006 | B1 | 3/2002 | Weyandt et al. |

(Continued)

FOREIGN PATENT DOCUMENTS

| GB | 838241 A | 6/1960 | |
| GB | 1536082 A | * 12/1978 | ............. B60Q 1/425 |
| JP | 2018174021 A2 | 11/2018 | |

OTHER PUBLICATIONS

UK Intellectual Property Office, Search report for UK Priority Application No. GB2001146.6, dated Jul. 22, 2020.

*Primary Examiner* — Lindsay M Low
*Assistant Examiner* — Omar Morales (57) ABSTRACT

A mount for an electrical connector includes a generally cylindrical body, and a concave protrusion and a connector receptacle each extending from an outer surface of the body. The connector receptacle is structured to receive pair of mated electrical connectors, and the body further defines a first hole and a second hole through which fasteners may secure each electrical connector within the connector receptacle. An actuator assembly includes an actuator having at least one flexible wire electrically coupled to a first electrical connector, a mount, a mount fastener, and a connector fastener. The connector fastener is disposed within the first hole and secured around the connector receptacle and the first electrical connector. A method includes attaching a mount fastener around a mount to secure the mount to the actuator and attaching a connector fastener through the first hole, around the connector receptacle, and around the first electrical connector.

16 Claims, 6 Drawing Sheets

(58) Field of Classification Search
USPC .......................................................... 439/533
See application file for complete search history.

(56) References Cited

U.S. PATENT DOCUMENTS

| | | |
|---|---|---|
| 7,877,969 B2 | 2/2011 | Behnke |
| 9,345,197 B2 | 5/2016 | Biggerstaff et al. |
| 9,426,943 B2 | 8/2016 | Bilde |
| 9,629,310 B2 | 4/2017 | Bilde |
| 10,207,658 B2 | 2/2019 | Chambosse |
| 2014/0128133 A1 | 5/2014 | Claerhout |

* cited by examiner

MOUNTS FOR ELECTRICAL CONNECTORS, ACTUATOR ASSEMBLIES, AND RELATED METHODS

CROSS-REFERENCE TO RELATED APPLICATIONS

This application claims the benefit of the filing date of U.S. Provisional Patent Application 62/958,800, filed Jan. 9, 2020, and U.K. Patent Application GB2001146.6, filed Jan. 28, 2020, the entire disclosure of each of which is incorporated herein by reference.

FIELD

Embodiments of the present disclosure relate to electrical connectors. More particularly, embodiments of the present disclosure relate to apparatus and methods for securing electrical connectors to oscillating hardware, such as in a cleaning unit of a combine harvester.

BACKGROUND

Self-propelled combine harvesters are used by farmers to harvest a wide range of crops. Typically, a combine harvester cuts crop material, threshes grain therefrom, separates the threshed grain from the straw, and cleans the grain before storage in an onboard tank. Straw and crop residue is ejected from the rear of the combine harvester in the field.

Combine harvesters typically include a cleaning unit to separate grain and chaff (also referred to in the art as material other than grain (MOG)). The cleaning unit may have one or more fans blowing air upward through a series of oscillating sieves. The sieves may have actuators attached thereto to adjust the size of openings in the sieve. The actuators and wiring may be designed to withstand the oscillations that the sieves are subjected to in operation of the cleaning unit.

Cleaning units in combine harvesters are described in more detail in, for example, U.S. Pat. No. 9,426,943, "Combine Harvester Grain Cleaning Apparatus," issued Aug. 30, 2016; and U.S. Patent Application Publication 2014/0128133, "Harvester Having Chaffer with Tiltable Section," published May 8, 2014.

BRIEF SUMMARY

A mount for an electrical connector includes a generally cylindrical body defining an inner surface and an outer surface, a concave protrusion extending from the outer surface, and a connector receptacle extending from the outer surface. The connector receptacle is structured to receive pair of mated electrical connectors, and the body further defines a first hole and a second hole through which fasteners may secure each electrical connector within the connector receptacle.

An actuator assembly includes an actuator having at least one flexible wire electrically coupled to a first electrical connector, a mount, a mount fastener, and a first connector fastener. The mount has a generally cylindrical body defining an inner surface and an outer surface, a concave protrusion extending from the outer surface, and a connector receptacle extending from the outer surface. The body further defines a first hole and a second hole through which fasteners may each secure an electrical connector within the connector receptacle. The mount fastener encircles the outer surface of the mount and secures the mount to the actuator such that the concave protrusion limits rotation of the mount about the actuator. The first connector fastener is disposed within the first hole and secured around the connector receptacle and the first electrical connector. The mount is configured such that a second connector fastener within the second hole can secure a second electrical connector to the mount when the second electrical connector is mated to the first electrical connector.

A method of securing an electrical connector to an actuator includes attaching a mount fastener around a body of a mount to secure the mount to the actuator such that the mount cannot rotate or translate with respect to the actuator, and attaching a first connector fastener through a hole in the body of the mount, around a connector receptacle of the mount, and around a first electrical connector to secure the first electrical connector to the connector receptacle. The first electrical connector is electrically connected to the actuator by a first flexible wire. The first electrical connector is disposed in the mount such that a second electrical connector can be mated to the first electrical connector and secured within the connector receptacle by a second connector fastener extending through another hole in the body of the mount without removing the first connector fastener.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments when read in conjunction with the accompanying drawings, in which:

DETAILED DESCRIPTION

All references cited herein are incorporated herein in their entireties. If there is a conflict between definitions herein and in an incorporated reference, the definition herein shall control.

The illustrations presented herein are not actual views of any combine harvester or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

Figure 1:
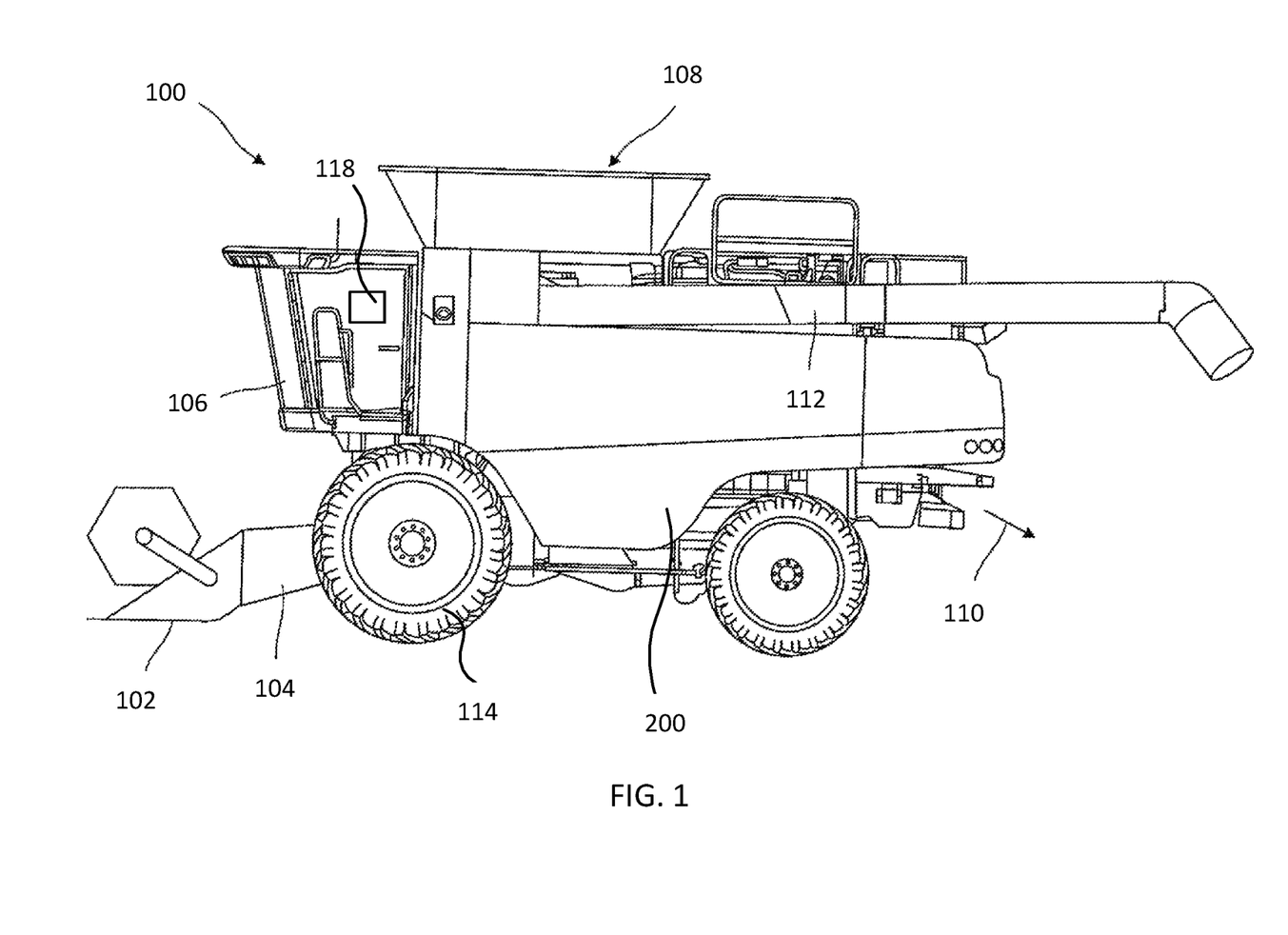
FIG. 1 is a simplified side view of a combine harvester.

With reference to FIG. 1, a self-propelled combine harvester 100 carries a header 102 that cuts and gathers a strip of crop as the combine harvester 100 is driven across a crop field. An elevator section 104 conveys the cut crop stream from the header 102 into a crop processing apparatus 200 in the combine harvester 100, described in more detail below. Clean grain separated from the crop stream is collected in a storage tank 108, which is periodically emptied into a trailer or other vehicle or storage container via an unloading auger 112. Residue material remaining from the crop stream, such as straw and chaff, is ejected from the rear of the combine harvester 100, represented by arrow 110. The combine harvester 100 also typically includes an operator cab 106, an engine, and wheels 114 and/or tracks.

Figure 2:
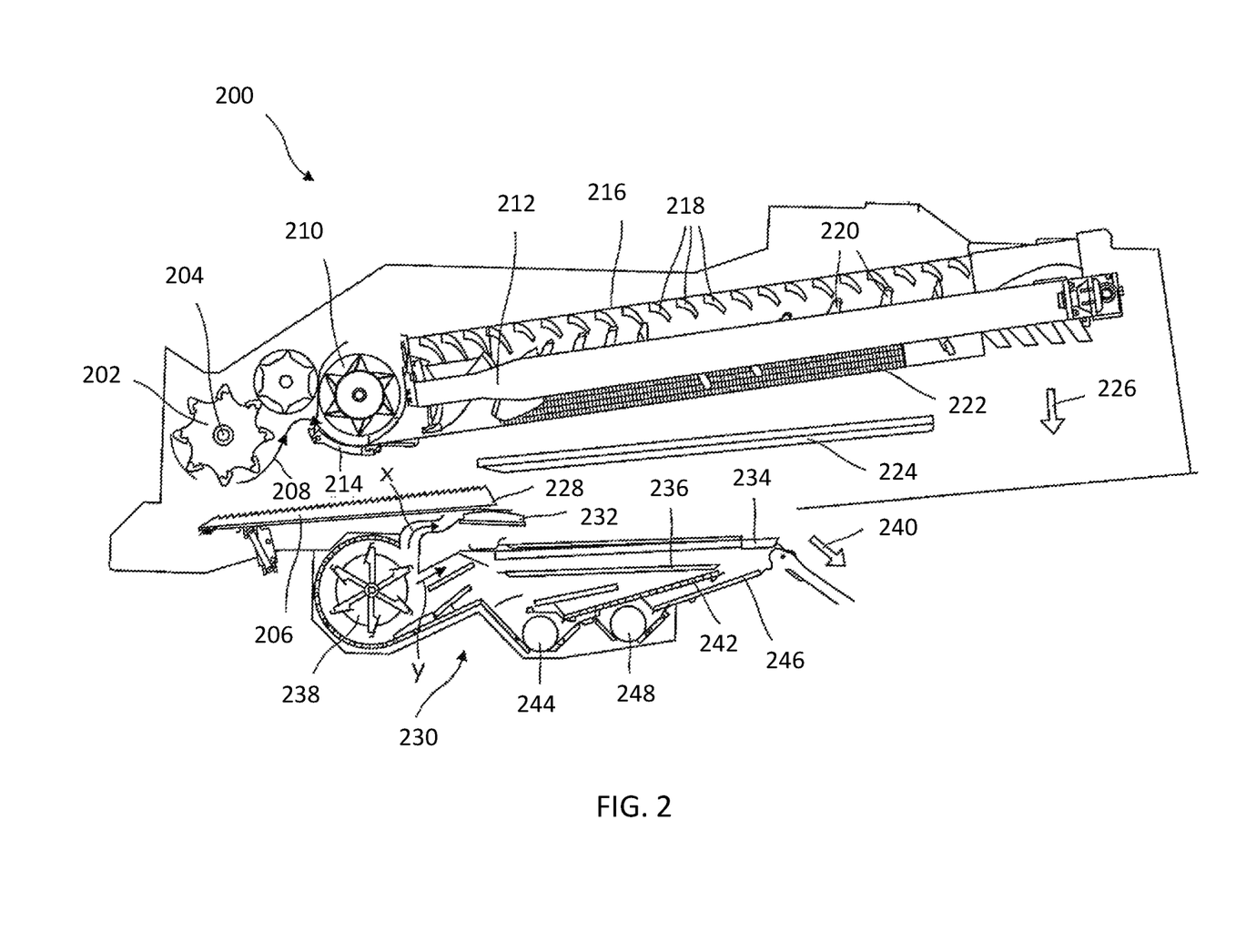
FIG. 2 is a simplified side view of a crop processing apparatus that may be used in the combine harvester of FIG. 1.

Turning to the details of the crop processing apparatus 200, as shown in FIG. 2, the crop stream passes from the elevator section 104 into a threshing unit having a transverse threshing cylinder 202 that rotates around a transverse axis 204. The crop stream is threshed between the threshing cylinder 202 and a concave surface (not shown). Grain and chaff separated in this process falls through a grate in the concave onto an underlying thresher pan 206, forming a primary grain/chaff stream. The residue straw is conveyed rearwardly as represented by arrow 208 from the threshing unit to a transverse transfer beater 210. From here, the crop stream is typically divided into two sub-streams and passed into respective longitudinally-aligned separating rotors 212. It will be appreciated that only one separating rotor 212 is shown in FIG. 2, with the other separating rotor 212 being hidden from view. The transfer beater 210 has associated therewith a concave grate 214 through which further grain and chaff may fall under gravity onto the underlying thresher pan 206.

Each separating rotor 212 has associated therewith a substantially cylindrical cage 216 within which the separating rotor 212 rotates. Upon the inside upper peripheral surface of the rotor cages 216, a plurality of guide vanes 218 are mounted for cooperation with fingers 220 of the separating rotor 212, which together further separate grain from straw. The lower portion of each cage 216 has a grate 222 formed therein, which allows separated grain and chaff to fall by gravity onto an underlying separator pan 224, forming a secondary grain/chaff stream.

The residue straw is ejected from the crop processing apparatus 200 at the rear of the separating rotors 212, as indicated by arrow 226.

Although the above described crop processing apparatus 200 includes a threshing cylinder 202 and transverse transfer beater 210 followed by a pair of longitudinal separating rotors 212 operating on an axial separation principle (which may be referred to in the art as a "hybrid" processing system), different processing apparatus may be used in some embodiments. For example, the separating rotors 212 may be replaced with straw walkers, as described in U.S. Pat. No. 7,877,969, "Method for Adjusting a Working Unit of a Harvesting Machine," granted Feb. 1, 2011. In other embodiments, the threshing cylinder 202 and transverse transfer beater 210 may be replaced by a feed cylinder, and threshing may be caused by the rotors 212, as described in U.S. Pat. No. 9,629,310, "Grain Separating Apparatus in a Combine Harvester," granted Apr. 25, 2017. In still other embodiments, the crop processing apparatus 200 may include one or more transverse rotors, as described in U.S. Pat. No. 9,345,197, "Combine Harvester with Even Crop Distribution," granted May 24, 2016.

Both the thresher pan 206 and separator pan 224 are driven in an oscillating manner to convey grain and chaff streams forwardly and rearwardly, respectively. In some embodiments, a stream of grain and chaff is transferred from a rear edge 228 of the thresher pan 206 to a cleaning shoe 230. The grain and chaff may initially fall onto a cascade pan 232 before falling from the rear edge 228 onto a chaffer 234 in the cleaning shoe 230. In other embodiments, various mechanisms may be used to convey the stream of grain and chaff to the cleaning shoe, which mechanisms are generally known in the art and not described in detail herein.

One or more blowers 238 generate a cleaning airstream, a portion of which is directed rearwardly between the thresher pan 206 and cascade pan 232 as represented by arrow X. The lighter chaff may be blown rearwardly and carried by the airstream out of the rear of the crop processing apparatus 200 as represented by arrow 240, while the heavier grain falls onto the cascade pan 232, and then onto the chaffer 234. Another airstream, represented by arrow Y, is directed rearwardly between the chaffer 234 and a sieve 236. The airstream(s) from the blower(s) 238 may be directed along any selected path. For example, the blower(s) may provide a single airstream to the chaffer 234. Again, the cascading motion of the grain and chaff allows the airstream Y to convey additional chaff toward the rear of the cleaning shoe 230. The chaffer 234 is coarser (having larger openings) than the sieve 236, which is located under the chaffer 234. The chaffer 234 and sieve 236 may also be referred to in the art as an upper sieve and lower sieve, respectively, because they may be of generally the same construction.

The chaffer 234 and the sieve 236 are generally driven forward and aft in an oscillating manner. Straw and material too large to pass through chaffer 234 is conveyed rearwardly by the oscillating motion before falling from the rear edge and out of the rear of the crop processing apparatus 200, as indicated by arrow 240. Tailings, or unthreshed grain, and grain passes through the chaffer 234 onto the sieve 236. Grain falls through sieve 236 onto an underlying collection pan 242, which directs the clean grain to a transverse delivery auger 244 for delivering the grain to the storage tank 108 (FIG. 1). The tailings that cannot pass through the holes in the sieve 236 are conveyed rearwardly by the oscillating motion before falling from the rear edge of the sieve 236 onto a tailings collection pan 246, which delivers the tailings to a rethreshing delivery system 248, which may include, for example, an auger, a blower, and/or a conveyor.

Figure 3:
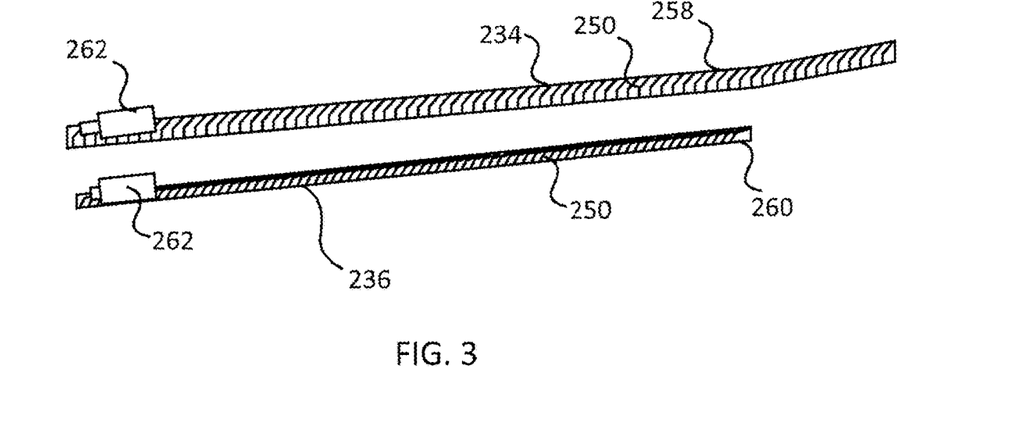
FIG. 3 is a simplified side view of a chaffer and sieve of the crop processing apparatus of FIG. 2.

FIG. 3 is a simplified side view of the chaffer 234 and the sieve 236, each of which may include a plurality of louvers 250 rotatably mounted to frame assemblies 258, 260. Each of the louvers 250 may rotate about lateral axes thereof (i.e., side-to-side, perpendicular to a longitudinal axis of the combine harvester 100) to change the size of openings in the chaffer 234 or the sieve 236. The orientation of the louvers 250 of the chaffer 234 and sieve 236 may be controlled by actuators 262 connected to the frame assemblies 258, 260. The actuators 262 may be electrically connected to the combine harvester 100.

Figure 4:
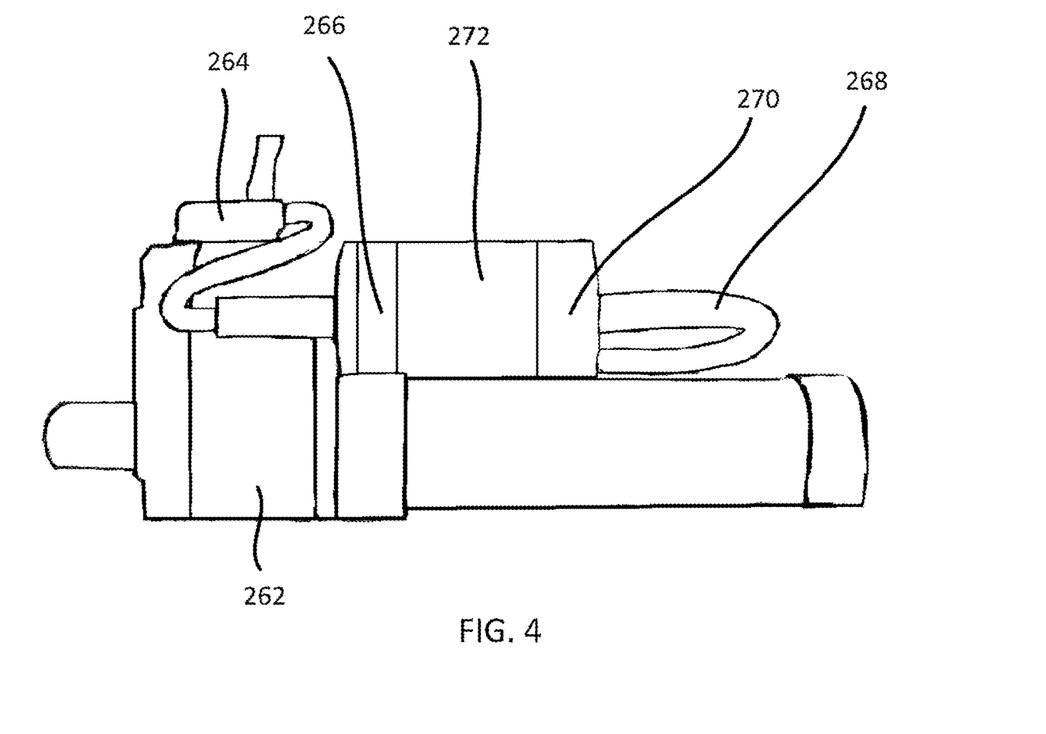
FIG. 4 is a photograph of an actuator that may be used to adjust the chaffer or sieve depicted in FIG. 3.
Figure 5:
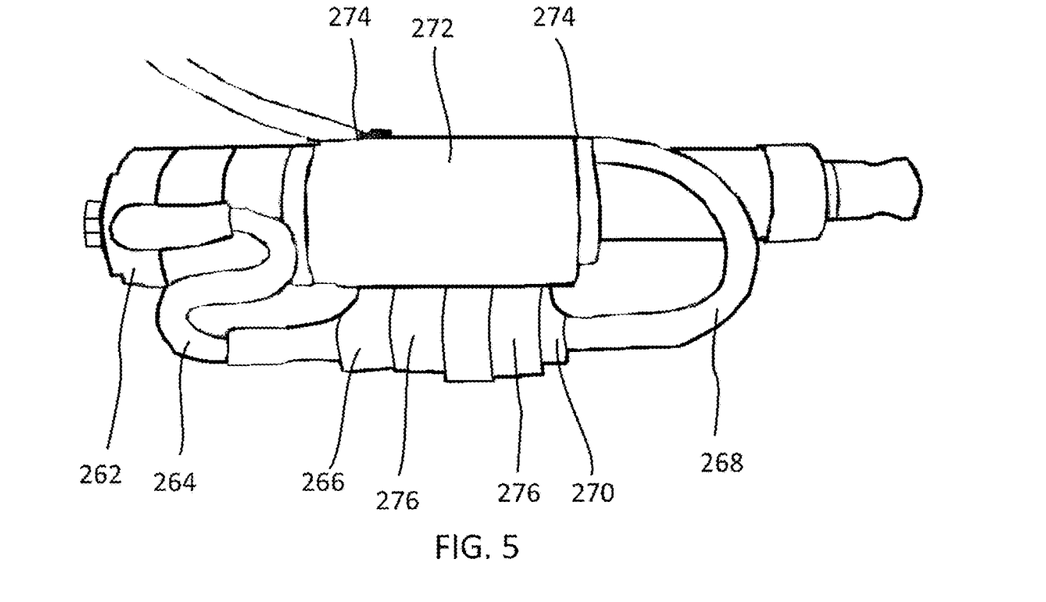
FIG. 5 is a photograph of the actuator shown in FIG. 4 from a different perspective.

FIGS. 4 and 5 are photographs of an actuator 262. The actuator 262 has a flexible wire 264 electrically coupled to a first electrical connector 266 (which may also be referred to in the art, alone or in combination with the wire 264, as a wiring harness). Another flexible wire 268 is connected to the combine harvester 100 and to a second electrical connector 270. The first electrical connector 266 is mated (i.e., physically and electrically connected) to the second electrical connector 270.

A mount 272 secures the first electrical connector 266 and the second electrical connector 270 to the actuator 262 and to each other such that the actuator 262, the second electrical connector 270, and the first electrical connector 266 move together as a unit. The actuator 262 typically moves with the frame assembly 258, 260 of the chaffer 234 or the sieve 236 (each of which may oscillate during operation), and fixing the first electrical connector 266 and the second electrical connector 270 to the actuator 262 may prevent relative movement of electrical contacts within the electrical connectors 266, 270. Thus, fixing the electrical connectors 266, 270 together may limit or prevent wear of the electrical contacts (which wear may cause the actuator 262 and/or sensors connected thereto to malfunction).

The mount 272 is secured to the actuator 262 by one or more mount fasteners 274, depicted as ratcheting cable ties. The mount fastener(s) 274 may exert sufficient force on the mount 272 to prevent the mount 272 from translating or rotating with respect to the actuator 262. In some embodiments, the fastener(s) 274 may include wires, hose clamps, clips, pins, etc. The electrical connectors 266, 270 may be secured to the mount 272 by connector fasteners 276. The connector fasteners 276 are depicted as ratcheting cable ties, but may likewise include wires, hose clamps, clips, pins, etc.

Figure 6:
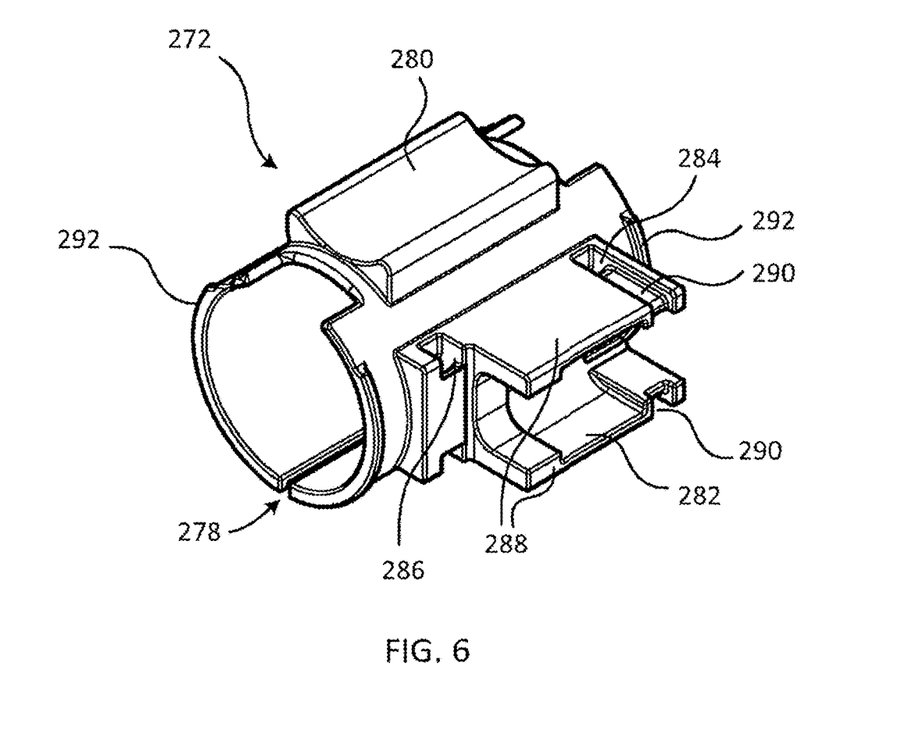
FIG. 6 is a simplified drawing of a mount to secure electrical connectors to the actuator shown in FIG. 4.

FIG. 6 is a simplified perspective view of the mount 272 separate from the actuator 262. The mount 272 has a generally cylindrical body 273 defining an inner surface 275 and an outer surface 277. The body 273 may be a single unitary body comprising a polymer, a metal, a composite, etc. In some embodiments, the body 273 may be an injection-molded plastic, such as HDPE, LDPE, PET, etc. The inner surface 275 may be sized and configured to fit around a cylindrical portion of the actuator 262. The body 273 may define a gap 278 therein, rendering the inner and outer surfaces 275, 277 discontinuous. The gap 278 may enable the mount fastener(s) 274 to clamp down on the mount 272 to hold the mount 272 to the actuator 262. The gap 278 may also facilitate installation and removal of the mount 272 because the body 273 of the mount 272 may flex as the mount 272 is manipulated.

A concave protrusion 280 may extend from the outer surface 277 of the body 273, and may be configured to prevent rotation of the mount 272 with respect to the actuator 262. That is, the curvature of the protrusion 280 may be selected to match the curvature of the actuator 262 against which the protrusion 280 rests. The protrusion 280 may define a portion of a cylinder having an axis parallel to an axis of the generally cylindrical body 273 of the mount 272.

A connector receptacle 282 may extend from the outer surface 277 of the body 273, and may be structured to receive the electrical connectors 266, 270. The body 273 of the mount 272 may define a first hole 284 and a second hole 286 through which the connector fasteners 276 (FIG. 5) may secure the electrical connectors 266, 270 within the connector receptacle 282. The connector receptacle 282 may have generally planar parallel sidewalls 288 extending from the outer surface of the body 273 of the mount 272, which may define exterior channels 290 to receive one or more of the fasteners 276 (FIG. 5). As shown in FIG. 6, the exterior channels 290 may be aligned with the first hole 284, such that when a fastener 276 passing through the first hole 284 is tightened, the fastener 276 rests in the exterior channels 290. The second hole 286 may be positioned such that a fastener 276 passing through the second hole 286 and around an electrical connector 266, 270 does not contact the sidewalls 288. Thus, the fastener 276 passing through the second hole 286 may be relatively easier to remove (e.g., by cutting) than the fastener 276 passing through the first hole 284 and resting in the channels 290.

One or more cylindrical lips 292 may be formed in the body at the ends of the mount 272. For example, the lips 292 may configured to prevent the mount fasteners 274 from sliding off the end of the mount 272 when the fasteners 274 are tightened. One lip 292 may be proximal to a first end of the body of the mount 272, and another lip 292 may be distal from the first end of the body.

Figure 7:
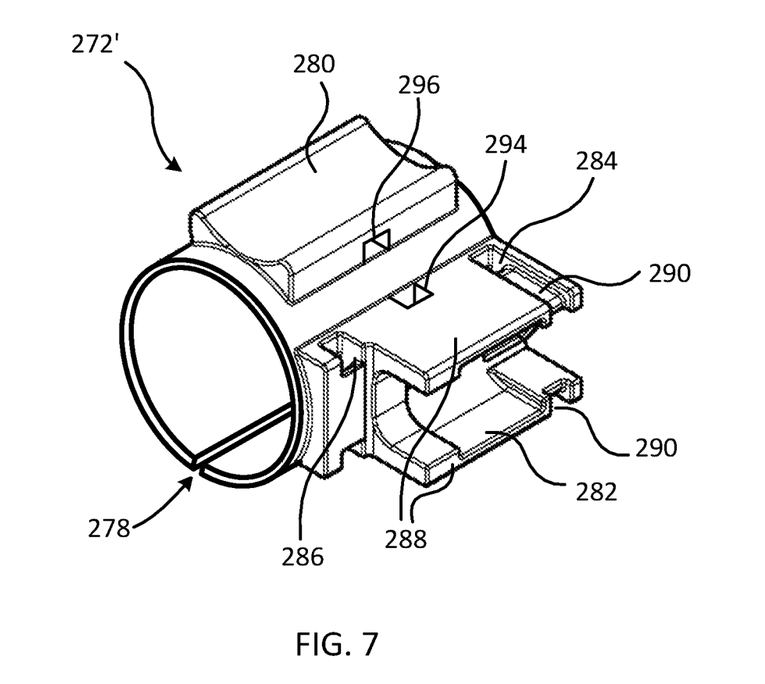
FIG. 7 is a simplified drawing of another mount to secure electrical connectors.

FIG. 7 is a simplified perspective view of another mount 272' that is similar to the mount 272, but without the lips 292. To secure the mount 292' to the actuator 262, a single fastener 274 may pass through a third hole 294 and a fourth hole 296 in the body of the mount 272'. These holes 294, 296 may located approximately midway between the ends of the mount 272' and may enable the mount 272' to be securely fastened to the actuator 262 with a single mount fastener 274 encircling the outer cylindrical surface of the mount 272'. As shown, the third hole 294 may be through or under the connector receptacle 282, and the fourth hole 296 may be through or under the protrusion 280. In other embodiments, the protrusion 280 and/or the connector receptacle 282 may be split into separate sections, with channels between the sections, rather than holes 294, 296 through or under the protrusion 280 and connector receptacle 282.

Figure 8:
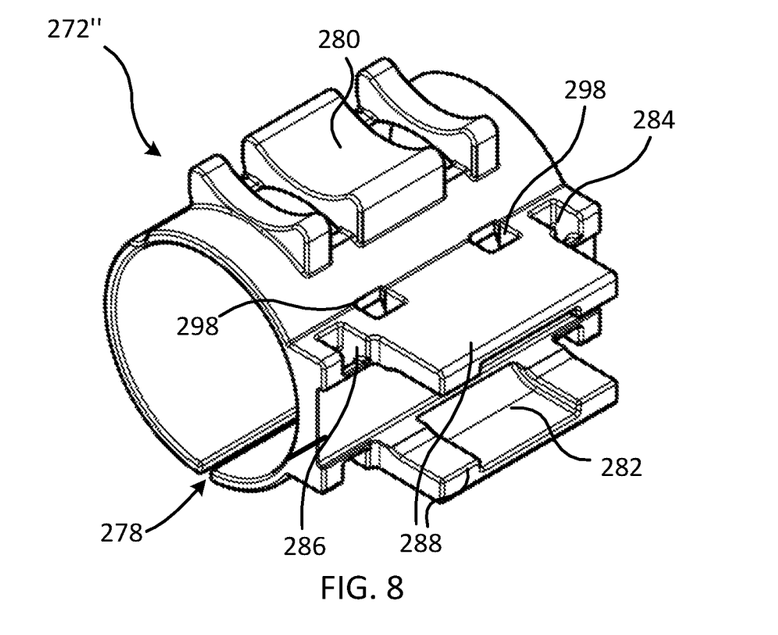
FIG. 8 is a simplified drawing of another mount to secure electrical connectors.

FIG. 8 is a simplified perspective view of another mount 272" that is similar to the mount 272', but with two holes 298 for fasteners 274 (FIG. 5) to secure the mount 292" to the actuator 262. The fasteners 274 may pass between cutout portions of the protrusion 280, which may be simpler to manufacture than the hole 296 shown in FIG. 7.

Figure 9:
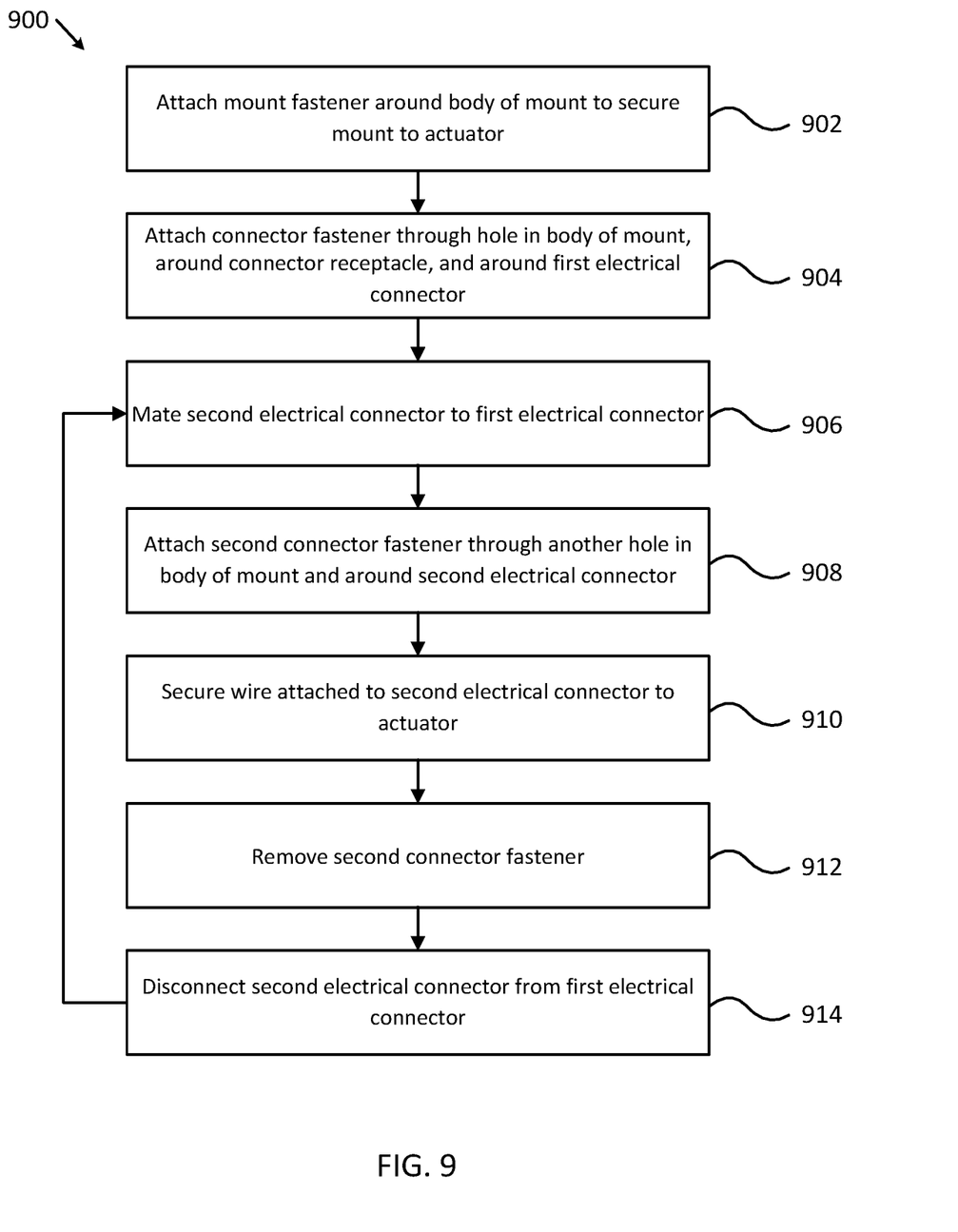
FIG. 9 is a simplified flow chart illustrating a method of securing an electrical connector to an actuator, as well as installing, uninstalling, and reinstalling the actuator in a machine.

FIG. 9 is a simplified flow chart illustrating a method 900 of securing an electrical connector to an actuator 262, as well as installing, uninstalling, and reinstalling the actuator 262 in a machine. In block 902, at least one mount fastener 274 is attached around a body of a mount 272 to secure the mount 272 to the actuator 262 such that the mount cannot rotate or translate with respect to the actuator 262. The mount fastener(s) 274 may be attached through one or more holes 294, 296 in the body of the mount, in channels between portions of the protrusion 280 and connector receptacle 282, or adjacent lips 292.

In block 904, a first connector fastener 276 is attached through a hole 284 in the body of the mount 272, around a connector receptacle 282, and around a first electrical connector 266 to secure the first electrical connector 266 to the connector receptacle 282.

In block 906, a second electrical connector 270 may be mated to the first electrical connector 266. In block 908, a second connector fastener 276 may be attached through the another hole 286 in the body of the mount 272 and around the second electrical connector 270 to secure the second electrical connector 270 to the connector receptacle 282. In block 910, a wire 268 that is electrically connected to the second electrical connector 270 may be secured to the actuator 262. For example, the wire 268 may be secured by one of the fasteners 274, 276 or by another fastener. Securing the wire 268 may further limit wear on the connectors 266, 270 by limiting the relative motion of pins or other connection points within the connectors 266, 270.

In block 912, to remove the actuator assembly, the second connector fastener 276 may be removed (e.g., cut). The second electrical connector 270 may be disconnected from the first electrical connector 266, in block 914, and the actuator assembly may be removed from the machine carrying the second electrical connector 270 (e.g., a combine). To reinstall the actuator assembly (e.g., after performing a repair) or a different actuator assembly, blocks 906, 908, and 910 may be repeated.

Additional non-limiting example embodiments of the disclosure are described below.

Embodiment 1: A mount for an electrical connector, the mount comprising a generally cylindrical body defining an inner surface and an outer surface, a concave protrusion extending from the outer surface, and a connector receptacle extending from the outer surface. The connector receptacle is structured to receive pair of mated electrical connectors, and the body further defines a first hole and a second hole through which fasteners may secure each electrical connector within the connector receptacle.

Embodiment 2: The mount of Embodiment 1, wherein the body further defines a third hole through which a fastener may encircle the outer surface of the body to secure the body to an actuator.

Embodiment 3: The mount of Embodiment 1, wherein the outer surface defines a first cylindrical lip proximal to a first end of the body and a second cylindrical lip distal from the first end of the body.

Embodiment 4: The mount of any of Embodiment 1 through Embodiment 3, wherein the connector receptacle has generally planar parallel sidewalls extending from the outer surface of the generally cylindrical body.

Embodiment 5: The mount of Embodiment 4, wherein the generally planar parallel sidewalls define exterior channels to receive a fastener.

Embodiment 6: The mount of Embodiment 5, wherein the first hole is aligned with the exterior channels such that a fastener surrounding a first connector of the pair of mated electrical connectors in the connector receptacle passes through the first hole and lies within the channels.

Embodiment 7: The mount of any of Embodiment 4 through Embodiment 6, wherein the second hole is positioned such that a fastener surrounding a second connector of the pair of mated electrical connectors in the connector receptacle does not contact the generally planar sidewalls.

Embodiment 8: The mount of any of Embodiment 1 through Embodiment 7, wherein the body defines a gap such that the inner and outer surfaces are discontinuous.

Embodiment 9: The mount of any of Embodiment 1 through Embodiment 8, wherein the concave protrusion defines a portion of a cylinder having an axis parallel to an axis of the generally cylindrical body.

Embodiment 10: The mount of any of Embodiment 1 through Embodiment 9, wherein the generally cylindrical body, the concave protrusion, and the connector receptacle comprise a single unitary body.

Embodiment 11: The mount of any of Embodiment 1 through Embodiment 10, wherein the generally cylindrical body, the concave protrusion, and the connector receptacle each comprise a polymer material.

Embodiment 12: An actuator assembly comprising an actuator having at least one flexible wire electrically coupled to a first electrical connector, a mount, a mount fastener, and a first connector fastener. The mount comprises a generally cylindrical body defining an inner surface and an outer surface, a concave protrusion extending from the outer surface, and a connector receptacle extending from the outer surface. The body further defines a first hole and a second hole through which fasteners may each secure an electrical connector within the connector receptacle. The mount fastener encircles the outer surface of the mount and secures the mount to the actuator such that the concave protrusion limits rotation of the mount about the actuator. The first connector fastener is disposed within the first hole and secured around the connector receptacle and the first electrical connector. The mount is configured such that a second connector fastener within the second hole can secure a second electrical connector to the mount when the second electrical connector is mated to the first electrical connector.

Embodiment 13: The actuator assembly of Embodiment 12, wherein the mount fastener is secured through a third hole defined in the body.

Embodiment 14: The actuator assembly of Embodiment 12 or Embodiment 13, wherein each of the mount fastener and the first connector fastener comprise ratcheting cable ties.

Embodiment 15: A method of securing an electrical connector to an actuator, the method comprising attaching a mount fastener around a body of a mount to secure the mount to the actuator such that the mount cannot rotate or translate with respect to the actuator, and attaching a first connector fastener through a hole in the body of the mount, around a connector receptacle of the mount, and around a first electrical connector to secure the first electrical connector to the connector receptacle. The first electrical connector is electrically connected to the actuator by a first flexible wire. The first electrical connector is disposed in the mount such that a second electrical connector can be mated to the first electrical connector and secured within the connector receptacle by a second connector fastener extending through another hole in the body of the mount without removing the first connector fastener.

Embodiment 16: The method of Embodiment 15, further comprising mating the second electrical connector to the first electrical connector, the second electrical connector electrically connected to a second flexible wire; attaching the second connector fastener through the another hole in the body of the mount and around the second electrical connector to secure the second electrical connector to the connector receptacle of the mount; and securing the second flexible wire to the actuator.

Embodiment 17: The method of Embodiment 16, further comprising removing the second connector fastener from the second electrical connector and the another hole, disconnecting the second electrical connector from the first electrical connector, and removing the actuator from a machine carrying the second electrical connector.

Embodiment 18: The method of Embodiment 17, further comprising reinstalling the actuator in the machine, reconnecting the second electrical connector to the first electrical connector, and installing another second connector fastener through the another hole and around the second electrical connector to secure the second electrical connector within the connector receptacle.

Embodiment 19: The method of any of Embodiment 15 through Embodiment 18, wherein attaching a mount fastener around a body of a mount comprises attaching the mount fastener through a further hole in the body of the mount.

Embodiment 20: The method of any of Embodiment 15 through Embodiment 19, further comprising attaching a second mount fastener around the body of the mount.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A mount for an electrical connector, the mount comprising:
   a generally cylindrical body defining an inner surface and an outer surface;
   a concave protrusion extending from the outer surface; and
   a connector receptacle extending from the outer surface, wherein the connector receptacle is structured to receive pair of mated electrical connectors, and wherein the body further defines a first hole and a second hole through which fasteners may secure each electrical connector within the connector receptacle wherein the connector receptacle has generally planar parallel sidewalls extending from the outer surface of the generally cylindrical body, wherein the generally planar parallel sidewalls define exterior channels to receive a fastener, and wherein the first hole is aligned with the exterior channels such that a fastener surrounding a first connector of the pair of mated electrical connectors in the connector receptacle passes through the first hole and lies within the channels.

2. The mount of claim 1, wherein the body further defines a third hole through which a fastener may encircle the outer surface of the body to secure the body to an actuator.

3. The mount of claim 1, wherein the outer surface defines a first cylindrical lip proximal to a first end of the body and a second cylindrical lip distal from the first end of the body.

4. The mount of claim 1, wherein the second hole is positioned such that a fastener surrounding a second connector of the pair of mated electrical connectors in the connector receptacle does not contact the generally planar sidewalls.

5. The mount of claim 1, wherein the body defines a gap such that the inner and outer surfaces are discontinuous.

6. The mount of claim 1, wherein the concave protrusion defines a portion of a cylinder having an axis parallel to an axis of the generally cylindrical body.

7. The mount of claim 1, wherein the generally cylindrical body, the concave protrusion, and the connector receptacle comprise a single unitary body.

8. The mount of claim 1, wherein the generally cylindrical body, the concave protrusion, and the connector receptacle each comprise a polymer material.

9. An actuator assembly, comprising:
   an actuator having at least one flexible wire electrically coupled to a first electrical connector;
   a mount, the mount comprising:
      a generally cylindrical body defining an inner surface and an outer surface;
      a concave protrusion extending from the outer surface; and
      a connector receptacle extending from the outer surface, wherein the connector receptacle is structured to receive pair of mated electrical connectors, and wherein the body further defines a first hole, a second hole, and a third hole through which fasteners may secure each electrical connector within the connector receptacle;
   a mount fastener encircling the outer surface of the mount and securing the mount to the actuator such that the concave protrusion limits rotation of the mount about the actuator, wherein the mount fastener is secured through the third hole defined in the body; and a first connector fastener disposed within the first hole and secured around the connector receptacle and the first electrical connector;

wherein the mount is configured such that a second connector fastener within the second hole can secure a second electrical connector to the mount when the second electrical connector is mated to the first electrical connector.

10. The actuator assembly of claim 9, wherein each of the mount fastener and the first connector fastener comprise ratcheting cable ties.

11. A method of securing an electrical connector to an actuator, the method comprising:

attaching a mount fastener around a body of a mount to secure the mount to the actuator such that the mount cannot rotate or translate with respect to the actuator; and attaching a first connector fastener through a hole in the body of the mount, around a connector receptacle of the mount, and around a first electrical connector to secure the first electrical connector to the connector receptacle, wherein the first electrical connector is electrically connected to the actuator by a first flexible wire;

wherein the first electrical connector is disposed in the mount such that a second electrical connector can be mated to the first electrical connector and secured within the connector receptacle by a second connector fastener extending through another hole in the body of the mount without removing the first connector fastener.

12. The method of claim 11, further comprising:

mating the second electrical connector to the first electrical connector, the second electrical connector electrically connected to a second flexible wire;

attaching the second connector fastener through the another hole in the body of the mount and around the second electrical connector to secure the second electrical connector to the connector receptacle of the mount; and securing the second flexible wire to the actuator.

13. The method of claim 12, further comprising:

removing the second connector fastener from the second electrical connector and the another hole;

disconnecting the second electrical connector from the first electrical connector; and removing the actuator from a machine carrying the second electrical connector.

14. The method of claim 13, further comprising:

reinstalling the actuator in the machine;

reconnecting the second electrical connector to the first electrical connector; and installing another second connector fastener through the another hole and around the second electrical connector to secure the second electrical connector within the connector receptacle.

15. The method of claim 11, wherein attaching a mount fastener around a body of a mount comprises attaching the mount fastener through a further hole in the body of the mount.

16. The method of claim 11, further comprising attaching a second mount fastener around the body of the mount.

* * * * *